W. B. PEIRCE.
GRINDING MACHINE.
APPLICATION FILED APR. 13, 1917.
1,277,472.
Patented Sept. 3, 1918.
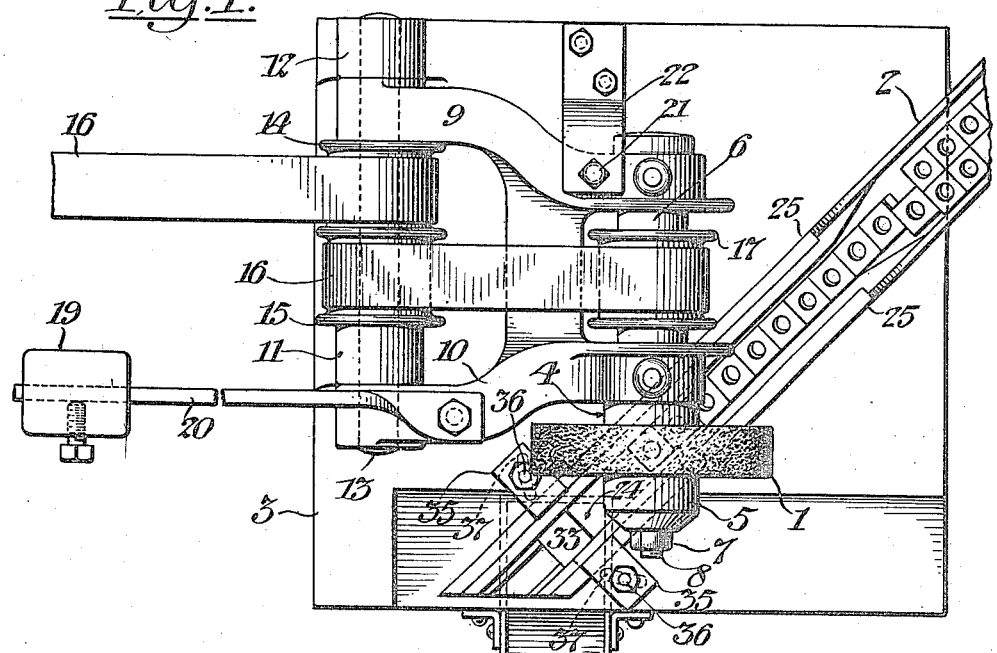
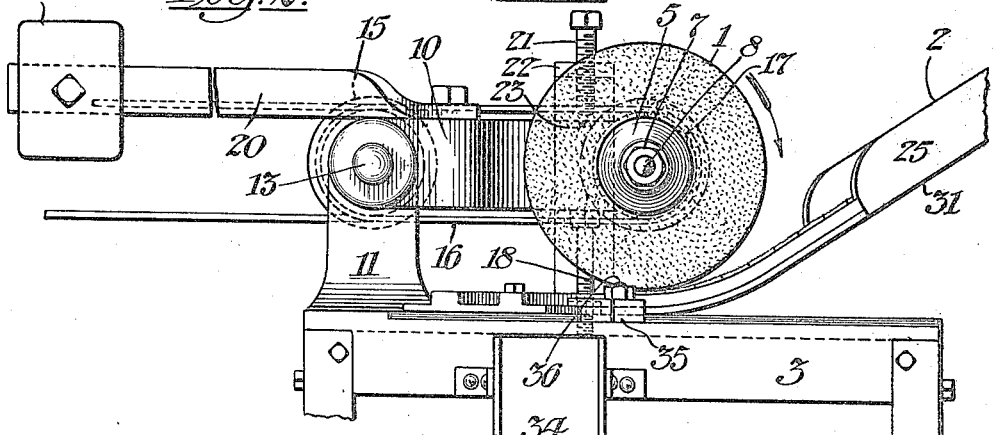
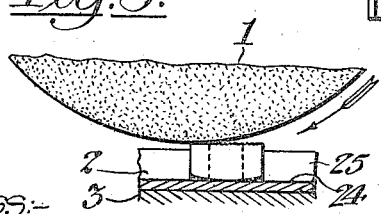
Inventor
William B. Peirce
by his Attorney

UNITED STATES PATENT OFFICE.

WILLIAM BRADFORD PEIRCE, OF NORTH TONAWANDA, NEW YORK, ASSIGNOR TO BUFFALO BOLT COMPANY, OF BUFFALO, NEW YORK, A CORPORATION OF NEW YORK.

GRINDING-MACHINE.

1,277,472.

Specification of Letters Patent.

Patented Sept. 3, 1918.

Application filed April 13, 1917. Serial No. 161,692.

*To all whom it may concern:*

Be it known that I, WILLIAM B. PEIRCE, a citizen of the United States, and resident of North Tonawanda, in the county of Niagara and State of New York, have invented certain new and useful Improvements in Grinding-Machines, of which the following is a specification.

My present invention is embodied in a machine for smoothing off the flat or clamping faces of nuts and although it is obviously applicable to other machines for specifically different purposes, I will describe it in connection with the use for which it was primarily intended.

These nuts are commonly made in automatic presses, wherein by successive operations the blanks are thinned, crowned on the lower side, punched in the center and finally trimmed square or hexagonal as desired, by punching them, crown first, through a suitable trimming die. This operation tends to wipe the metal backward and so form an upstanding fin or flash which outlines part and sometimes all of the clamping surface of the nut.

In practice, the amount of metal which must be ground off from the clamping faces of the successive nuts in order to smooth them is extremely variable, some specimens requiring grinding over a considerable part of the surface while others require little or none.

In devising my grinding machine for the specific work above described, one object has been to utilize the rotary movement of the grinder to automatically feed the nuts or other articles, across the path of the grinder and out of the machine.

To this end, the nuts are fed to the grinder between parallel guides arranged at an acute angle to the direction of movement of the operative face of the grinder so that the friction of the latter upon the nut forces it against one of the guides and slides it forwardly along said guide as fast as the excess metal is ground off.

The advantage of this is that the rate of feed for the successive nuts varies automatically according to the amount of the metal there is to be ground off from each individual nut. As the grinder is driven at relatively high speed, a nut requiring no grinding will shoot through at high speed while one requiring much grinding will move forward only so fast as permitted by the rate of grinding off of the surplus metal.

If the supply of nuts is kept up and if the angle of the nut guides with respect to the direction of movement of the operative surface of the grinder is properly adjusted, the latter may be kept continuously employed grinding off the metal at its maximum practically permissible grinding rate irrespective of the great variation in the amounts of metal to be removed from the successive individual nuts. Any desired means may be employed for keeping up the supply of nuts, a simple means being an inclined guide in which is a continuous stream of nuts sliding forward by gravity so that the foremost nut is continuously but non-positively pressed toward the grinder by the weight of the nuts behind it.

The grinder is preferably mounted so as to be capable of yielding vertically against the force of gravity, its normal operating position being at a fixed minimum distance from the bottom of the trough which may be predetermined by a set-screw in accordance with the thickness of the nuts.

The amount of the downward pressure is regulated in any suitable manner, as for instance, by an adjustable counterweight and is preferably sufficient to cause the grinder to dress off most of the inequalities of the thicker nuts without the necessity of removing a layer of metal across the entire surface.

In cases where uniform thickness is essential, the angle of the trough to the grinder will be regulated so as to permit slower feed and a longer grinding period and the gravity pressure will be made sufficient to prevent vertical yielding of the grinder, except in abnormal cases where there would be danger of marring or breaking the grinder.

A desirable embodiment of my invention is shown in the annexed drawings in which—

Figure 1 is a top plan view of the machine;

Fig. 2 is an end view; and

Figs. 3 and 4 are respectively elevation and plan views of a portion of the grinder guideway and nut showing now the grinder automatically feeds the nut forward in the guideway.

In the drawings, a rotary grinder 1 and guideway 2 are mounted upon a suitable support 3. The grinder is clamped between a fixed collar 4 and a clamping collar 5 on shaft 6 by means of a nut 7 screwing on to stud 8.

This shaft is mounted in parallel supporting arms 9, 10, which are pivotally mounted on brackets 11, 12 by a pivotal shaft 13. Upon this shaft are rotatably mounted the belt pulleys 14, 15. The pulley 14 is driven from any suitable source of power by the belt 16 and to it is rigidly secured the pulley 15 which, through belt 16, drives the pulley 17 on the grinder shaft.

The grinder 1 is normally maintained at the required minimum distance above the bottom of the guideway 2 by means of a vertically adjustable set-screw 18, the head of which butts against the under side of the pivoted supporting arm 9. The normal downward pressure of the grinder against the set-screw 18 may be accurately predetermined and adjusted by means of the counterweight 19 which is slidably mounted upon lever arm 20, which is rigidly secured to the pivoted support 10. The maximum possible vertical yield of the grinder may be limited by means of the vertical screw 21 screw-threaded in the bracket 22 in position for engaging the pivoted support 9 at the point 23.

The guideway for the nuts comprises a suitable bed-plate 24 and lateral guides 25—25. The latter are preferably slightly less in height than the thickness of the nuts and are spaced apart a distance only slightly greater than the width of the nuts. These dimensions are of considerable importance for the portion of the guideway passing directly under the grinder because, as will be evident from Fig. 4, the grinder must be wide enough so that its lowermost straight line element will extend entirely across the guideway and the more acute the angle of the trough to the axis of the grinder, the greater will the thickness of the grinder have to be. Hence the narrower the width of the guideway can be made, the more acute will be the angle of its permissible adjustment with respect to a grinder of a given width.

The guideway is formed with an inclined portion 31 in which will be maintained a gravity pressed stream of nuts adapted to keep up the supply to the grinder 2. On the exit side of the grinder is arranged a vertical opening 33 through which the nuts fall to the discharge chute 34.

The guideway is adjustably secured to any suitable means, as for instance, clamps 35—35, secured by bolts 36 engaging slots 37 in the table 3. The slots 37 are preferably concentric with a point directly below the center of the grinder so as to facilitate angular adjustment of the guideway without lateral displacement thereof with respect to the lowermost operative portion of the grinder.

From the above it will be evident that the greater the angle at which the path of the guide crosses the plane of the grinder, the slower will be the feed of the nuts, but angles approximating 90° are not practicable because the increased friction of the nut against the side of the guideway becomes too great for the correlatively decreased feeding resultant of the grinder friction. On the other hand, if the guideway crosses the plane of the grinder at too small an angle, the feeding resultant will be too rapid for the practically permissible grinding rate of the grinder. In such case, the grinder may yield vertically and permit passage of the nut without proper grinding of its surface, or if its gravity adjustment be too heavy to permit this, the grinder may be damaged or the metal of the nut may be overheated and wiped off laterally by the grinder, thereby producing a lateral fin or feather edge on the side of the nut which will be as objectionable in its way as was the original upstanding fin.

With the above principles in mind, it is a very simple matter for one skilled in the art to adjust the machine so as to get a rate of feed for articles of widely differing size, shape and material, which will be suitable to the practically permissible metal removing capacity of the grinder. In most cases, it will only be necessary to provide a grinder of ample diameter and thickness continuously driven at a fairly high speed; to set the minimum thickness adjustment and the gravity counterbalance to suit the thickness of the nut and the amount of excess metal to be ground off; and finally to arrange the guideway so as to cross the plane of the grinder at an angle somewhat greater than 45°. In some cases, further refinements of the various adjustments will be suggested upon practical operation of the machine and noting the condition of the nuts as they are discharged from the machine.

While I have described a desirable embodiment of my invention, it will be obvious that various changes will be possible without departing from the spirit of my invention, as for instance, it will be evident that it is the relative location, arrangement and adjustment of the parts that is of prime importance rather than which of the several elements are actually moved in order to effect the desired changed relation. It will be obvious, too, that certain features of my invention will be applicable to rotary material removing implements other than grinders and to articles other than nuts.

I claim:

1. In a machine of the class described, a high speed rotary grinder and a guideway having side and bottom guide surfaces extending past said grinder at an acute angle to the direction of feed of the article and to the direction of movement of the operative surface of said grinder, whereby the latter simultaneously grinds the article and forces them forward at speeds varying with and automatically determined by the amount of metal ground from each successive nut.

2. In a machine of the class described, a guideway and a high speed rotary grinder arranged at an acute angle to the guideway and rotated in a direction to feed articles forward in the guideway as rapidly as the material is removed by the grinding, in combination with means normally operating to hold said grinder at a predetermined distance from the bottom of said guide but adapted to yield and feed through any article of abnormal thickness.

3. In a machine of the class described, a high speed rotary grinder having a circularly curved grinding surface and a guideway having an inclined portion of sufficient length and steepness to permit maintaining a continuous strain of nuts forced forward by gravity, said guideway having a side guide and a bottom guide extending past said grinder with said bottom guide opposite said curved surface and with said side guide at an acute angle to the direction of movement of the nuts and to the direction of movement of the adjacent curved surface of said grinder, whereby the latter simultaneously grinds and forces the articles forward along said side guide, at speeds varying with and automatically determined by the amount of metal ground from each successive nut, said guideway having an unobstructed outlet for free escape of said nuts however rapidly they may be driven forward by the grinder, in combination with means normally operating to hold said grinder at a predetermined distance from the bottom of said guide but adapted to yield and feel through any article of abnormal thickness.

4. An automatic grinding machine comprising a high speed cylindrical grinder, and a guideway extending in operative relation to a straight line element of the periphery of said cylindrical grinder and across the path of movement of the same, at an acute angle to the direction of movement thereof, in combination with means for adjusting the acuteness of the angle of said guide, and means for yieldingly maintaining the grinder and guideway at a predetermined minimum distant apart corresponding to the desired thickness of the articles to be operated upon by the grinder.

5. An automatic grinding machine comprising a high speed cylindrical grinder, and a guideway extending in operative relation to a straight line element of the periphery of said cylindrical grinder and across the path of movement of the same, at an acute angle to the direction of movement thereof, in combination with means for adjusting the acuteness of the angle of said guide and means for yieldingly maintaining the grinder and guideway at a predetermined minimum distance apart corresponding to the desired thickness of the articles to be operated upon by the grinder, together with means for maintaining in said guideway a continuous stream of articles non-positively pressed toward the grinder.

6. An automatic grinding machine comprising a high speed cylindrical grinder, and a guideway extending in operative relation to a straight line element of the periphery of said cylindrical grinder and across the path of movement of the same, at an acute angle to the direction of movement thereof, in combination with means for adjusting the acuteness of the angle of said guide and means for yieldingly maintaining the grinder and guideway at a predetermined minimum distance apart corresponding to the desired thickness of the articles to be operated upon by the grinder, together with an inclined extension for said guideway whereby the articles in a continuous train are fed forward by gravity into operative relation to said grinder.

7. In a machine of the class described, a high speed rotor having a suitable working surface, and a guideway extending in operative relation to a straight line element of the periphery of said rotor at an acute angle to the direction of movement thereof, in combination with means for adjusting the acuteness of the angle of said guide relatively to the operative portion of the periphery of said rotor, and means for yieldingly maintaining the rotor and guideway at a predetermined minimum distance apart determined by the amount of material to be removed from said articles by said rotor.

8. A grinding machine comprising a suitable support, standards on said support, a shaft hanger pivotally mounted in said standards, a grinder shaft journaled in said hanger parallel with the pivot thereof, a belt pulley and a cyilndrical grinder on said shaft, a belt driven pulley and a driving pulley rotatably mounted concentric with the pivotal axis of said hanger, a belt on the latter pulley driving the pulley on said grinder shaft, a counter-balance for said grinder and shaft arranged on the opposite side of the pivotal axis of said hanger, an adjustable stop for determining the normal lowermost position of said grinder, and means for limiting the possible upward movement thereof, in combination with a vertically inclined guideway extending beneath said grinder in operative relation to the lowermost portion of the periphery thereof at an angle greater than 45° to the plane of rotation of said grinder and means for varying the acuteness of said angle for the purpose described.

Signed at North Tonawanda, in the county of Niagara and State of New York, this 9th day of April, A. D. 1917.

WM. BRADFORD PEIRCE.